No. 775,389. PATENTED NOV. 22, 1904.
A. L. BROOKS.
FISH TRAP.
APPLICATION FILED APR. 1, 1904.
NO MODEL.
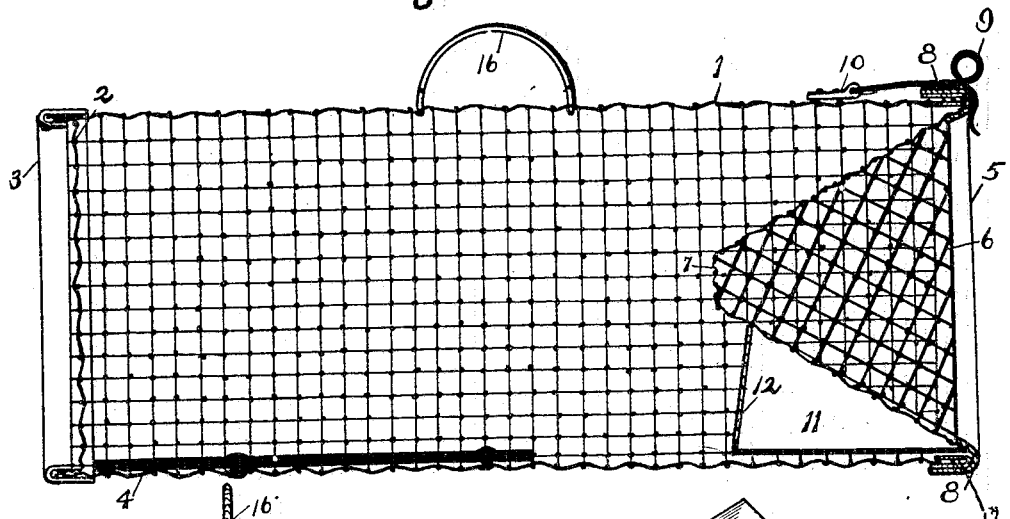
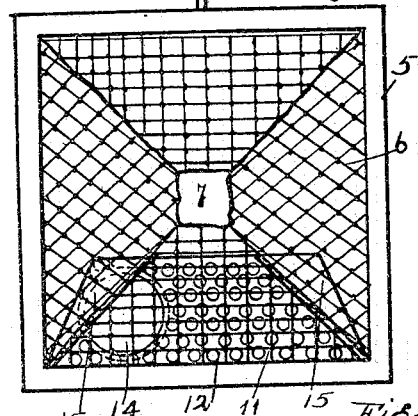
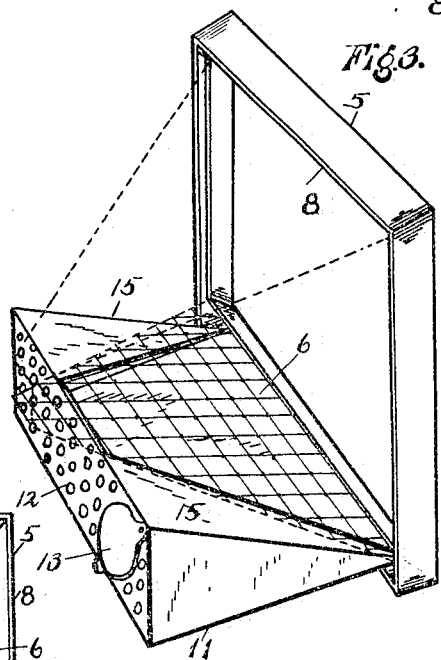
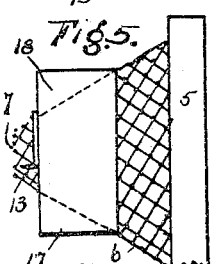
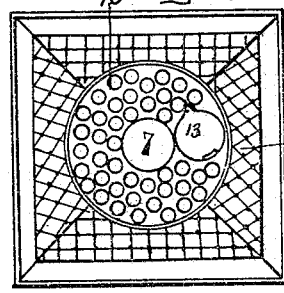
Witnesses
H. H. Hood
A. C. King
Inventor
Almond L. Brooks
By his Attorney
Ernest K. Hood No. 775,389. Patented November 22, 1904.

UNITED STATES PATENT OFFICE.

ALMOND L. BROOKS, OF COLUMBUS, INDIANA.

FISH-TRAP.

SPECIFICATION forming part of Letters Patent No. 775,389, dated November 22, 1904.

Application filed April 1, 1904. Serial No. 201,143. (No model.)

*To all whom it may concern:*

Be it known that I, ALMOND L. BROOKS, a citizen of the United States of America, residing at Columbus, in the State of Indiana, (post-office address the same,) have invented certain new and useful Improvements in Fish-Traps, of which the following is a specification.

The object of my invention is to provide a light, durable, and efficient trap and to also provide proper means for holding the food used as bait in the proper place at all times; and my invention consists in the combination and arrangement of parts hereinafter described and claimed.

Traps are usually made so that the bait is placed in the body part of the trap and the fish can feed thereon after being caught. The food and fish also become mixed together when the former are removed and a great deal of the food is thus lost.

In the drawings, Figure 1 is a longitudinal section; Fig. 2, a front end elevation; Fig. 3, a perspective detail of the feed-box; Fig. 4, a modified form of feed-box, and Fig. 5 a side elevation of the same.

The numeral 1 represents the main body part, which can be made of either sheet metal, netting, or perforated metal, as desired, and can be made in any form. I, however, prefer a rectangular form on account of the ease of handling and making, and when put in position it is more stable than a round trap.

One end of body part 1 is headed with a perforated or netting end 2, held in position by means of a U-shaped clamp edge 3, which is firmly soldered in position. The opposite end of body part 1 is provided with a clamp edge 17, which makes a firm and secure binding for the wire. In this end I mount a rectangular frame 5, preferably removable, which is provided with a flange 8, taking outside of flange or binding 17, and is held in position when made removable by means of a hook 9, hinged to a loop 10, secured to body part 1. Secured to frame 5 and extending into body part 1 is a pyramid or cone shaped inlet 6, preferably constructed of wire-netting and provided at its apex with an opening 7. A food-box 11 is secured to inlet 6 and in one form shown is directly below the inlet 6 and above the bottom of body part 1, the bottom, sides, and a portion of the top being sheet metal, while the upper open part is partially covered by the netting of inlet 6. The rear or back wall of feed-box 11 is perforated, as shown at 12, and is also provided with an opening 14, through which food can be inserted. This opening is normally closed by means of a removable cap 13. In the modified form shown in Figs. 4 and 5 the feed-box is cylindrical in form and surrounds a portion of inlet 6 and is provided with a rear perforated plate 19, thus forming a space 18 for the food.

I provide a handle 16 for convenience in handling and a sinking-weight 4 to insure the trap staying in the proper place when once placed. In the preferred construction it will be seen that the inlet and feed-box are integral and can be removed from the trap.

In operation the end carrying the inlet and feed-box is removed and food (usually crackers) is placed in feed-box 11 through opening 14. This opening is then closed and the entire inlet replaced in the trap, as shown, and is securely held by hook 9. The trap is then placed in a stream with the inlet downstream. The current of water passes through the trap through perforated end 12 and carries the aroma and small particles of food through netting 6, thus forming a long trail downstream, up which minnows follow until they congregate in inlet 6. Large numbers pass through opening 7 in search of a better way to attack the food. Then to remove the minnows the trap is raised and the entire inlet is removed, thus taking the food with it, and the minnows can be poured into a bucket and the inlet replaced.

I have found by actual experience that the minnows will follow a food-trail thus formed for a long way, and large numbers are easily captured.

I do not wish to limit myself to the exact details and construction shown; but

I claim as my invention—

1. A fish-trap consisting of a body part; a screened or perforated end; a cone or pyramid shaped inlet opposite the screened end; and a feed-box integral with said inlet, provided with a perforated rear wall and a screened open side adjacent the inlet substantially as and for the purpose set forth.

2. A fish-trap consisting of a body part; a screened or perforated rear end; a removable screened cone or pyramid shaped inlet opposite the screened end; and a feed-box integral with said inlet, provided with a perforated rear wall and an open side partially covered with the screen forming the inlet, substantially as and for the purpose set forth.

3. In a fish-trap the combination of a body part; a screened or perforated rear end; a removable screened cone-shaped inlet opposite the rear end, and a cylindrical feed-box encircling a portion of the inlet, said feed-box having a perforated rear wall, and an open front side covered by the screen forming the inlet substantially as and for the purpose set forth.

4. In a fish-trap the combination of a body part; a screened or perforated rear end; a removable inlet preferably pyramid-shaped and constructed of a screen material said inlet normally held in position by suitable locking means, a feed-box integral with said inlet, provided with a perforated rear wall, and an open front normally covered by the screen forming the inlet; an opening in the feed-box through which food is inserted, and a cover normally covering said opening substantially as and for the purpose set forth.

ALMOND L. BROOKS.

Witnesses:
E. K. HOOD,
H. H. HOOD.